United States Patent
Yu et al.

(10) Patent No.: US 11,753,699 B2
(45) Date of Patent: Sep. 12, 2023

(54) COST-EFFECTIVE METHOD FOR RECOVERING PRECIOUS METALS IN CIRCUIT BOARD COMPONENTS

(71) Applicant: BEIJING UNIVERSITY OF TECHNOLOGY, Beijing (CN)

(72) Inventors: Jiamei Yu, Beijing (CN); Jiaqi Guo, Beijing (CN)

(73) Assignee: BEIJING UNIVERSITY OF TECHNOLOGY, Beijing (CN)

(*) Notice: Subject to any disclaimer, the term of this patent is extended or adjusted under 35 U.S.C. 154(b) by 0 days.

(21) Appl. No.: 17/975,606

(22) Filed: Oct. 28, 2022

(65) Prior Publication Data
US 2023/0175096 A1    Jun. 8, 2023

Related U.S. Application Data

(63) Continuation of application No. PCT/CN2022/080536, filed on Mar. 14, 2022.

(30) Foreign Application Priority Data

Dec. 3, 2021 (CN) .......... 202111472243.1

(51) Int. Cl.
  *C22B 11/00* (2006.01)
  *C22B 7/00* (2006.01)
(52) U.S. Cl.
  CPC .......... *C22B 11/046* (2013.01); *C22B 7/007* (2013.01)
(58) Field of Classification Search
  CPC .......... C22B 11/046; C22B 7/007
  USPC .......... 75/744
  See application file for complete search history.

(56) References Cited

U.S. PATENT DOCUMENTS 4,662,938 A    5/1987    Whitney

FOREIGN PATENT DOCUMENTS

| CN | 1603432 A | * | 4/2005 |
| CN | 101760624 A | * | 6/2010 |
| CN | 101928840 A |  | 12/2010 |
| CN | 104532005 A |  | 4/2015 |
| CN | 105755289 A | * | 7/2016 |
| CN | 105755289 A |  | 7/2016 |
| CN | 105755829 A |  | 7/2016 |
| CN | 107312932 A | * | 11/2017 |
| CN | 112695199 A |  | 4/2021 |
| CN | 114134337 A |  | 3/2022 |
| CN | 217922248 U | * | 11/2022 |

(Continued)

OTHER PUBLICATIONS

International Search Report of PCT/CN2022/080536.

*Primary Examiner* — Melissa S Swain
(74) *Attorney, Agent, or Firm* — J.C. PATENTS

(57) ABSTRACT

A cost-effective method for recovering precious metals in circuit board components utilizes the basic principle of oxidation-reduction reaction, adopts a mixed solution of sulfuric acid and hydrogen peroxide and a mixed solution of hydrochloric acid, sodium chloride and sodium chlorate, and also adopts ammonia water and formaldehyde to reduce silver. According to the characteristic that the redox potential of gold and palladium ions is higher, the gold and palladium ions in the chlorination leaching solution are selectively reduced into elements by using a reducing agent which is low in price and moderate in reducibility, then the elements are separated through filtration to realize resource recycling.

6 Claims, 1 Drawing Sheet

(56) References Cited

FOREIGN PATENT DOCUMENTS

| | | | |
|---|---|---|---|
| CN | 115537571 A | * | 12/2022 |
| WO | WO2019229632 A1 | | 12/2019 |
| WO | WO2023047139 | * | 3/2023 |

* cited by examiner

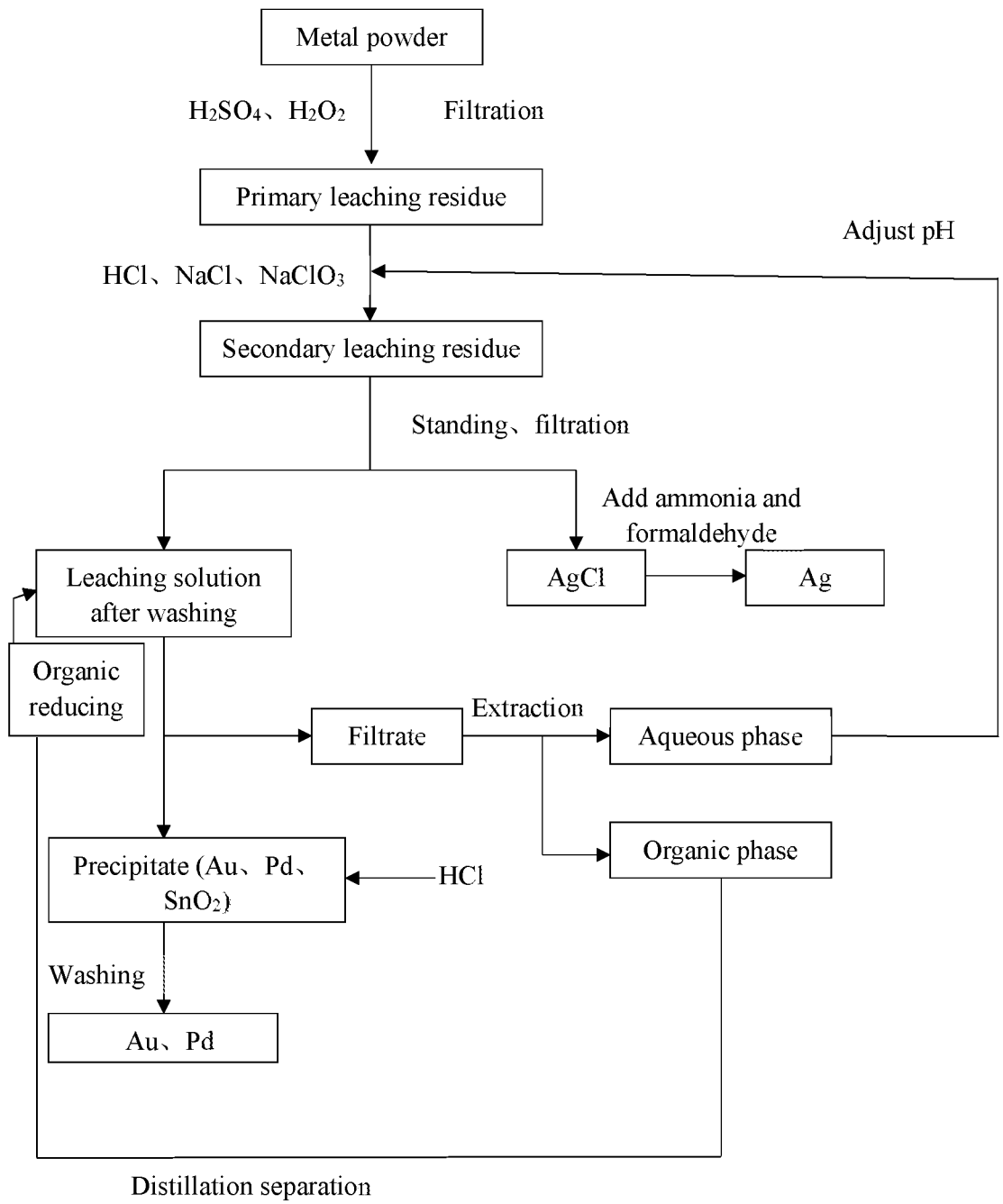

COST-EFFECTIVE METHOD FOR RECOVERING PRECIOUS METALS IN CIRCUIT BOARD COMPONENTS

CROSS-REFERENCE TO RELATED APPLICATION

This application is a continuation of PCT/CN2022/080536 filed on Mar. 14, 2022, which claims priority to Chinese application No. 202111472243.1 filed on Dec. 3, 2021, the contents of the above applications are hereby incorporated by reference in its entirety and made a part of this specification.

TECHNICAL FIELDS

The invention belongs to the field of waste resource recycling, and relates to a cost-effective method for recovering precious metals in circuit board components.

BACKGROUND

Circuit boards are the core components of electronic products, which exist in mobile phone boards, computer boards, audio equipment boards, LED boards and other equipment. With the rapid development of the electronic information industry, while its production volume is increasing, the amount of scrap is also increasing day by day.

According to statistics, in 2020, the amount of scrapped circuit boards in China will reach 7.0361 million tons. According to a research report, it is estimated that by 2030, the waste of electronic products in China will exceed 27 million tons. With the continuous increase in the production and sales of electronic products, a large number of waste components will be generated. If these electronic wastes are not disposed reasonably and effectively, they will cause environmental pollution and make environmental problems more prominent.

Components on waste circuit boards are mainly composed of high molecular polymers, resins, glass fibers and various metal components. According to statistics, the total metal content of waste circuit board components accounts for about 40%, and the non-metal content accounts for about 60%. The metal part mainly contains metal aluminum, copper, nickel, iron, zinc, tin and other ordinary metals, and contains precious metals such as gold, silver, platinum, and palladium. The content of precious metals in circuit board components is very high, especially the content of precious metal gold can be as high as 80 g/t, which is much higher than the grade of 3-5 g/t in domestic primary gold ore, and has quite high economic value. If the waste circuit board components are effectively recycled and the precious metals are efficiently extracted, it will not only alleviate the problem of resource scarcity caused by the low per capita mineral resources, but also bring considerable economic benefits.

At present, there are many kinds of valuable metal recovery methods for discarded circuit board components, mainly include three methods: mechanical method, wet processing, fire processing. Emerging methods such as supercritical fluid method and microbial processing method is also used. Mechanical method: the waste circuit board is disassembled by mechanical method, the components in it are separated from the substrate, and then different metals and non-metals are completely dissociated into powder by crushing methods such as impact, shearing, and extrusion. According to the differences in physical properties such as density, conductivity, and magnetism of each component, the separation of metal and non-metal substances is realized. The advantages of this method are simple process flow, low cost and environmentally friendly that selected by a lot of circuit board processing company. But the disadvantage is that the product purity is not high.

Wet processing: wet leaching technology mainly uses nitric acid, hydrochloric acid, etc. as oxidants, and utilizes the characteristics that metals can dissolve in these strong oxidizing media to achieve the separation of metals and non-metals. There is also a class of methods that use a solution of some specific compounds as solvents, which generally have selectivity for specific metals, such as cyanide method, thiourea method, thiosulfate method. Wet processing has the advantages of wide adaptability, high metal recovery rate and high product purity, but the disadvantages are also more prominent. The treatment process is long, in the process a large number of acids and bases are added, including cyanide, a highly toxic substance, which produce environmental pollution.

Fire processing: Fire processing is a traditional method of extracting metals. The temperature is controlled at 350-900° C. under anaerobic or oxygen-deficient conditions, and the circuit board is heated to separate metals and non-metals. The advantage is that it can handle all forms of electronic waste, but the incineration process may produce toxic waste gas such as dioxins. Therefore, this method has higher requirements on the incinerator. Generally speaking, the investment of pyrometallurgy is high, especially the investment in equipment and environmental protection.

Although supercritical processing technology and biometallurgy have good effects, they are currently mostly used in laboratories and cannot be widely used in large-scale applications.

SUMMARY

The invention solves the problem of selective recovery of precious metals in the chlorinated liquid of circuit board components through a low-cost and high-efficiency method, and the recovery process avoids generating a large amount of tail liquid and polluting the environment. Compared with the traditional recovery method, the invention has the characteristics of short treatment process flow, simple equipment, high recovery rate of precious metals, low price of reducing agent and tail liquid recycling.

The recovery method of precious metal in the present invention is as follows:

(1) Leaching: add the metal powder after crushing and magnetic separation to the mixed solution of sulfuric acid and hydrogen peroxide, and react at 70-90° C. for 2-3 hours; the liquid-solid ratio between metal powder and mixed solution is 4:1-8:1;

In mixed solution: concentration of sulfuric acid is 1.5 mol/L, the mass percentage concentration of hydrogen peroxide is 20%-30%, and the volume ratio between sulfuric acid and hydrogen peroxide is 2:1-4:1; after filtration, the filter residue is added with a mixed solution of hydrochloric acid, sodium chloride and sodium chlorate to react at 70 to 90° C. for 2 to 3 hours to obtain a metal chloride leaching solution, the liquid-solid ratio is 5:1-9:1, the concentration of hydrochloric acid in the mixed solution is 0.5-1.5 mol/L, the concentration of sodium chloride is 120-190 g/L, and the concentration of sodium chlorate is 6.82-20.46 g/L.

(2) Precipitation: the metal chloride leaching solution of step (1) is cooled to room temperature and filtered to obtain solid silver chloride, wherein the solid silver chloride is added into ammonia water and formaldehyde to obtain silver element; the filtrate obtained by cooling the metal chloride leaching solution to room temperature and filtering is added to organic reduction reaction with reagents, keep the temperature at 50-70° C. for 6-10 hours, filter out the precipitation material, including gold, palladium and tin dioxide, after washed with hydrochloric acid, gold and palladium is obtained; organic reducing agent refers to one or more of the amides organic compounds (such as N,N-dimethylformamide (DMF), N,N-dimethylacetamide (DMA), etc.).

(3) Circulation: the filtrate obtained from the reaction of metal chloride leaching solution and organic reducing agent in step (2) is added to the extractant for extraction, the organic phase is separated from the extractant and the organic reducing agent by decompression distillation, and the organic reducing agent is continue used in step (2); The extractant refers to one or more of dichloromethane, trichloromethane and benzene; after extraction, add hydrochloric acid, sodium chlorate into water phase until the concentration of hydrochloric acid, sodium chlorate and sodium chloride equal to the mixed solution in step (1); the water phase after extraction and circulations is regarded as last tail liquor, sodium chloride is recovered from the tail gas by evaporative crystallization.

The beneficial effects of the invention are as follows: most of the gold, silver and palladium in the leaching solution of the metal powder of the components after crushing and magnetic separation can be separated out, so as to be recycled. Compared with the traditional wet recovery process, the method not only greatly shortens the process flow of precious metal recovery, but also has good economic benefits due to the low price of the reducing agent, which is conducive to industrialization. At the same time, the tail liquid is recycled in the recovery process, avoiding a large amount of environmental pollution. The recovery rate of gold can reach 96.7%, the recovery rate of palladium can reach 91.2%, and the recovery rate of silver can reach 98.2%.

APPENDED DRAWINGS

FIG. 1 is a schematic flow chart of a cost-effective method for recovering precious metals in circuit board components.

PREFERRED EMBODIMENTS

The present invention will be further described below with reference to the embodiments, but the present invention can be implemented in various ways covered by the claims and is not limited to the following embodiments.

The method of the present invention recovers gold, silver and palladium from metal powder of circuit board components through the steps of leaching, precipitation and circulation.

Referring to FIG. 1, a cost-effective method for recovering precious metals in circuit board components after crushing and magnetic separation comprises the following steps:

(1) Leaching: add the metal powder after crushing and magnetic separation to the mixed solution of sulfuric acid and hydrogen peroxide, and react at 70-90° C. for 2-3 hours; the liquid-solid ratio between metal powder and mixed solution is 4:1-8:1;

In mixed solution: concentration of sulfuric acid is 1.5 mol/L-3 mol/L, the mass percentage concentration of hydrogen peroxide is 20%-30%, and the volume ratio between sulfuric acid and hydrogen peroxide is 2:1-4:1; after filtration, the filter residue is added with a mixed solution of hydrochloric acid, sodium chloride and sodium chlorate to react at 70 to 90° C. for 2 to 3 hours to obtain a metal chloride leaching solution, the liquid-solid ratio is 5:1-9:1, the concentration of hydrochloric acid in the mixed solution is 0.5-1.5 mol/L, the concentration of sodium chloride is 120-190 g/L, and the concentration of sodium chlorate is 6.82-20.46 g/L.

(2) Precipitation: the metal chloride leaching solution of step (1) is cooled to room temperature and filtered to obtain solid silver chloride, wherein the solid silver chloride is added into ammonia water and formaldehyde to obtain silver element; the filtrate obtained by cooling the metal chloride leaching solution to room temperature and filtering is added to organic reduction reaction with reagents, keep the temperature at 50-70° C. for 6-10 hours, filter out the precipitation material, including gold, palladium and tin dioxide, after washed with hydrochloric acid, gold and palladium is obtained; organic reducing agent refers to one or more of the amides organic compounds (such as N,N-dimethylformamide (DMF), N,N-dimethylacetamide (DMA), etc.).

The principle of silver, gold and palladium precipitation is: silver chloride and ammonia water form a soluble complex, which is reduced to silver element by formaldehyde. The redox potentials of gold and palladium in precious metals are higher than those of common metals, such as copper, aluminum, nickel, tin, etc.

The higher the potential, the stronger the oxidization, and the more prone to redox reactions. Under specific experimental conditions, amide organic compounds (such as N,N-dimethylformamide (DMF), N,N-dimethylacetamide (DMA), etc.) are reducible and can undergo redox with precious metals reaction, so that precious metals can be selectively precipitated out.

(3) Circulation: the filtrate obtained from the reaction of metal chloride leaching solution and organic reducing agent in step (2) is added to the extractant for extraction, the organic phase is separated from the extractant and the organic reducing agent by decompression distillation, and the organic reducing agent is continue used in step (2); The extractant refers to one or more of dichloromethane, trichloromethane and benzene; after extraction, add hydrochloric acid, sodium chlorate into water phase until the concentration of hydrochloric acid, sodium chlorate and sodium chloride equal to the mixed solution in step (1); the water phase after extraction and circulations is regarded as last tail liquor, sodium chloride is recovered from the tail gas by evaporative crystallization.

Embodiment 1

Add the metal powder after crushing and magnetic separation to sulfuric acid and hydrogen peroxide mixed solution to react at 70° C. for 2 hours. The liquid-solid ratio between metal powder and mixed solution is 5:1. In mixed solution, concentration of sulfuric acid is 2 mol/L, the mass percentage concentration of hydrogen peroxide is 25%, and the volume ratio of them is 4:1. Obtain filtrate and filter residue by filtration. Add the filter residue into a mixed solution of hydrochloric acid, sodium chloride and sodium chlorate to react at 70° C. for 3 hours to obtain a metal chloride leaching solution, the liquid-solid ratio of the mixed solution is 6:1, the concentration of hydrochloric acid is 0.5 mol/L, the concentration of sodium chloride is 120 g/L, and the concentration of sodium chlorate is 6.82 g/L. The composition of the metal chloride leaching solution is Au, Ag, Pd, Cu, Ni, Al and Sn with the concentration of 260.16 mg/L, 693.8 mg/L, 73.18 mg/L, 203.52 mg/L, 180.83 mg/L, 187.83 mg/L and 198.04 mg/L. The metal chloride leaching solution is cooled to room temperature and filtered to obtain solid silver chloride, wherein the solid silver chloride is added into ammonia water and formaldehyde to obtain silver element.

Put the filtrate into a bottle, add DMF with a volume of 40% of the filtrate, seal and keep it in a 50° C. for 7 hours, a precipitate appears at the bottom of the bottle. Filtrate and wash with hydrochloric acid to obtain gold palladium elemental substance. The filtrate is extracted by dichloromethane, and the organic phase is separated from dichloromethane and DMF by distillation under reduced pressure. After extraction, add hydrochloric acid and sodium chlorate to the aqueous phase, until the concentration of hydrochloric acid reaches 0.5 mol/L, the concentration of sodium chloride reaches 120 g/L, and the concentration of sodium chlorate reaches 6.82 g/L.

The supernatant after the reaction is taken for inductively coupled plasma spectrometer (ICP) test. The results showed that the recovery rate of gold is 96.7%, the recovery rate of palladium is 91.2%, and the recovery rate of silver is 98.2%.

Embodiment 2

Add the metal powder after crushing and magnetic separation to sulfuric acid and hydrogen peroxide mixed solution to react at 70° C. for 2 hours. The liquid-solid ratio between metal powder and mixed solution is 5:1. In mixed solution, concentration of sulfuric acid is 2 mol/L, the mass percentage concentration of hydrogen peroxide is 25%, and the volume ratio of them is 4:1. Obtain filtrate and filter residue by filtration. Add the filter residue into a mixed solution of hydrochloric acid, sodium chloride and sodium chlorate to react at 70° C. for 3 hours to obtain a metal chloride leaching solution, the liquid-solid ratio of the mixed solution is 6:1, the concentration of hydrochloric acid is 0.5 mol/L, the concentration of sodium chloride is 120 g/L, and the concentration of sodium chlorate is 6.82 g/L. The composition of the metal chloride leaching solution is Au, Ag, Pd, Cu, Ni, Al and Sn with the concentration of 260.16 mg/L, 693.8 mg/L, 73.18 mg/L, 203.52 mg/L, 180.83 mg/L, 187.83 mg/L and 198.04 mg/L. The metal chloride leaching solution is cooled to room temperature and filtered to obtain solid silver chloride, wherein the solid silver chloride is added into ammonia water and formaldehyde to obtain silver element.

Put the filtrate into a bottle, add DMF with a volume of 50% of the filtrate, seal and keep it in a 60° C. for 10 hours, a precipitate appears at the bottom of the bottle. Filtrate and wash with hydrochloric acid to obtain gold palladium elemental substance. The filtrate is extracted by dichloromethane, and the organic phase is separated from dichloromethane and DMF by distillation under reduced pressure. After extraction, add hydrochloric acid and sodium chlorate to the aqueous phase, until the concentration of hydrochloric acid reaches 1 mol/L, the concentration of sodium chloride reaches 150 g/L, and the concentration of sodium chlorate reaches 6.82 g/L.

The supernatant after the reaction is taken for inductively coupled plasma spectrometer (ICP) test. The results showed that the recovery rate of gold is 95.3%, the recovery rate of palladium is 90.3%, and the recovery rate of silver is 96.2%. The above descriptions are only preferred embodiments of the present invention, and are not intended to limit the present invention. For those who skilled in this area, the present invention may have various modifications and changes. Any modification, equivalent replacement, improvement, etc. made within the spirit and principle of the present invention shall be included within the protection scope of the present invention.

We claim:
1. A cost-effective method for recovering precious metals in circuit board components, comprising following steps:
   (1) leaching: add metal powder after crushing and magnetic separation to a first mixed solution of sulfuric acid and hydrogen peroxide, and react at 70-90° C. for 2-3 hours; a liquid-solid ratio between the metal powder and the first mixed solution is 4:1-8:1; after filtration, filter residue is added with a second mixed solution of hydrochloric acid, sodium chloride and sodium chlorate to react at 70-90° C. for 2-3 hours to obtain a metal chloride leaching solution, a liquid-solid ratio of the metal chloride leaching solution is 5:1-9:1;
   (2) precipitation: the metal chloride leaching solution of step (1) is cooled to room temperature and filtered to obtain solid silver chloride, wherein the solid silver chloride is added into ammonia water and formaldehyde to obtain silver element; add an organic reducing agent to a filtrate obtained by cooling the metal chloride leaching solution to room temperature and filtering to react at 50-70° C. for 6-10 hours, filter out precipitation material, including gold, palladium and tin dioxide, after washed with hydrochloric acid, gold and palladium is obtained;
   (3) circulation: add an extractant to a filtrate obtained from the reaction of the organic reducing agent and the filtrate obtained by cooling and filtering the metal chloride leaching solution in step (2) for extraction, after extraction, an organic phase and a water phase are obtained, the extractant and the organic reducing agent are separated from the organic phase by decompression distillation, and the organic reducing agent is reused in step (2); add hydrochloric acid, sodium chlorate into the water phase until a concentration of hydrochloric acid, sodium chlorate and sodium chloride becomes equal to that of the second mixed solution in step (1) to obtain a recycled water phase; the recycled water phase is circulated back to step (1) to be reused as the second mixed solution, and the water phase after extraction and circulations is regarded as last tail liquor, sodium chloride is recovered from the tail gas by evaporative crystallization.

2. The cost-effective method for recovering precious metals in circuit board components according to claim 1, wherein, in the first mixed solution of step (1): a concentration of sulfuric acid is 1.5 mol/L-3 mol/L, a mass percentage concentration of hydrogen peroxide is 20%-30%, and a volume ratio between sulfuric acid and hydrogen peroxide is 2:1-4:1.

3. The cost-effective method for recovering precious metals in circuit board components according to claim 1, wherein, in the second mixed solution of step (1), the concentration of hydrochloric acid is 0.5-1.5 mol/L, the concentration of sodium chloride is 120-190 g/L, and the concentration of sodium chlorate is 6.82-20.46 g/L.

4. The cost-effective method for recovering precious metals in circuit board components according to claim 1, wherein the organic reducing agent in step (2) is one or more of amide organic compounds.

5. The cost-effective method for recovering precious metals in circuit board components according to claim 1, wherein the extractant in step (3) is one or more of dichloromethane, chloroform and benzene.

6. The cost-effective method for recovering precious metals in circuit board components according to claim 4, wherein the organic reducing agent in step (2) is selected from N,N-Dimethylformamide (DMF) and N,N-dimethylacetamide (DMA).

* * * * *